Nov. 10, 1970 A. E. BOZSVAI 3,539,851
DYNAMOELECTRIC MACHINE STATOR MOUNTING
Filed Oct. 11, 1968

INVENTOR.
ALEXANDER E. BOZSVAI
BY Woodling, Krost,
Granger and Rust,
ATTORNEYS.

United States Patent Office 3,539,851
Patented Nov. 10, 1970

3,539,851
DYNAMOELECTRIC MACHINE STATOR
MOUNTING
Alexander E. Bozsvai, Solon, Ohio, assignor to Reliance
Electric Company, a corporation of Delaware
Filed Oct. 11, 1968, Ser. No. 766,760
Int. Cl. H02k 5/00
U.S. Cl. 310—91
3 Claims

ABSTRACT OF THE DISCLOSURE

The dynamoelectric machine mounting is disclosed as mounting the stator of a tachometer onto a frame which may be a motor or generator frame having a rotatable shaft. The tachometer has a rotor rotating with the shaft and a cooperating stator. The stator includes a stator core, permanent magnets and a winding with the magnets encapsulated in a hardened plastic to waterproof the winding. Further the hardened plastic establishes the stator coaxially with the rotor by interfitting rabbeted shoulders and further the hardened plastic is fastened directly to the motor or generator to support the entire tachometer stator.

BACKGROUND OF THE INVENTION

Dynamoelectric machine mountings are of two general types either free-standing with separate bearings to journal and locate the shaft and rotor or a dependent mounting type. In this latter form, no bearings are contained within the package; instead the journalling and concentricity of the rotor relative to the stator is maintained by means of support from some other, and usually larger, machine such as a motor or generator. This dependent mounting type is frequently used on tachometers or other small dynamoelectric machines mounted as a part of and used with a larger generator or motor. In such case the larger bearings of the motor or generator are used to journal and maintain the concentricity of the rotor of the tachometer.

In the dependent mounting type some means must be provided to assure that the rotor of the tachometer is coaxial with the rotor of the large motor or generator and also other means must be provided to assure that the stator of the tachometer is concentric with this same axis. In any manufactured item such as a tachometer there are a number of parts which must be assembled together and each one has its own tolerance of dimensions. The cumulative tolerance of these several parts may become quite large and this seriously affects the concentricity of the rotor and stator of the tachometer. These two parts should be concentric within close limits in order to maintain a uniform air gap between the rotor and stator in order to have a constant voltage developed by the rotor as it rotates within the stator.

In both the dependen mounting type and the independent mounting or free-standing type, it is customary to assemble the parts of the stator and to separately assemble the parts of the rotor and then as the two are brought together, gauges, dial indicators or spacers are used to correctly concentrically align the rotor and stator. At this points it is usual to then drill holes for mounting the stator of the tachometer onto the motor or generator end bell or end bracket. Dowel pins are then inserted in the holes. Next the tachometer stator may be fixedly attached to this end bell, as by bolts or cap screws and the dowels perform the function of maintaining the concentricity of the stator and rotor of the tachometer.

This complicated mounting procedure takes considerable time and skill and materially increases the cost of the tachometer as actually mounted on the machine with which it is to be used. For free-standing mounting of tachometers, the tachometer has its own bearings, but still there is the problem of aligning and mounting the base of the tachometer onto a shelf, for example, on the end bell or end bracket of the motor or generator with which it is being used. The same problems exist of not only maintaining the concentricity of the tachometer shaft with that of the motor shaft at the point of attachment, but also to make sure that these two shaft axes are coaxial. Again this takes gauges and shims to determine and maintain such concentricity and coaxial positions.

If the tachometer is to be mounted onto the motor or generator in the factory at the time of manufacture, then these gauges, dial indicators, and shims are generally available. However if the tachometer is to be mounted in the field, such as a replacement tachometer being installed, then this complicated mounting procedure takes considerable time for the serviceman and greatly increases the cost to the user of the mounted tachometer.

Accordingly an object of the present invention is to obviate much of this mounting expense and complications.

Another object of the invention is to provide a mounting for a tachometer wherein the tachometer stator is encapsulated to be waterproof and the encapsulation establishes the concentricity of the tachometer stator and rotor.

Another object of the invention is to provide a triple purpose plastic encapsulation of a tachometer stator wherein such hardened plastic encapsulates and waterproofs the winding on the stator, establishes a rabbet fit with the end bell of the motor for concentricity and provides the fastening means securing the entire stator to the end bell.

Another object of the invention is to provide a tachometer stator mounting which may be readily used without any gauge, dial indicators, or shims and which may be easily mounted or replaced in the field yet maintaining the required tolerance of concentricity between the stator and rotor of the tachometer.

SUMMARY OF THE INVENTION

The invention may be incorporated in a mounting for a stator of a dynamoelectric machine for use with a frame and a rotatable shaft, said mounting comprising, in combination, first locator surface means on said frame, a rotor connected for rotation with the shaft, a stator core cooperating with said rotor, winding means on said stator core, an insulator encasing said stator winding means and having second locator surface means cooperable with said first locator surface means to substantially coaxially dispose said stator core relative to said rotor, and fastening means securing said stator core to the frame.

DESCRIPTION OF THE PREFERRED EMBODIMENT

Figure 4:
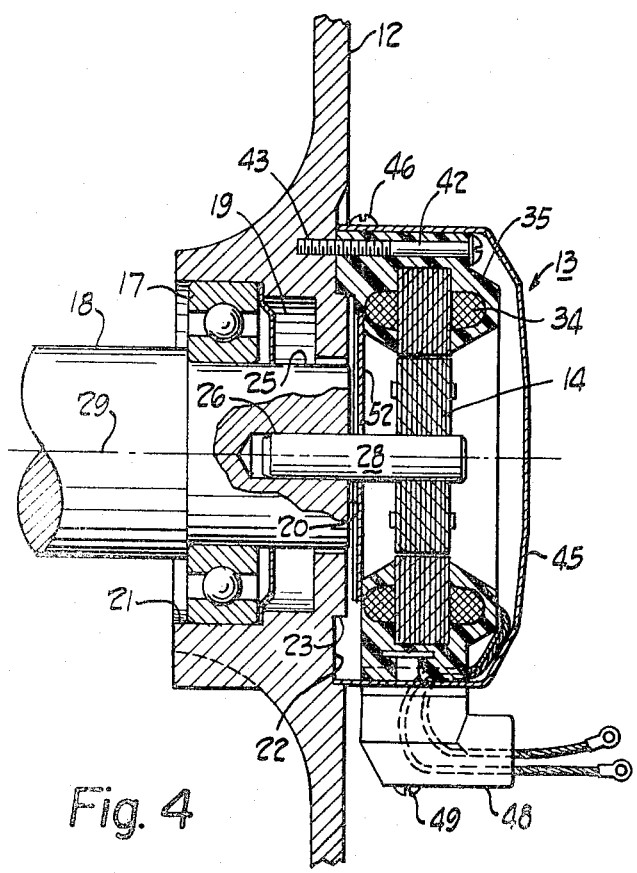
FIG. 4 is a sectional view similar to FIG. 3 but with the stator and rotor mounted on a frame.
Figure 3:
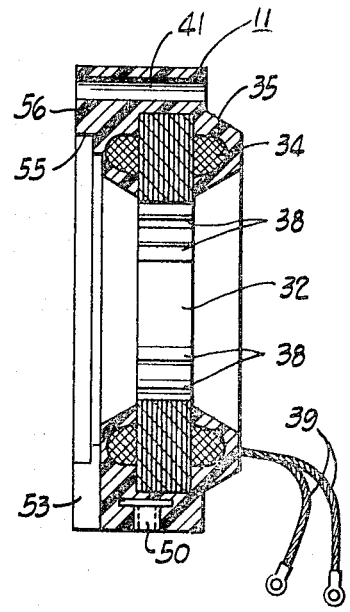
FIG. 3 is a sectional view on line 3–3 of FIG. 2.

The figures of the drawing show a mounting of a dynamoelectric machine state 11 to a frame 12. In this embodiment the stator 11 is shown as a part of a tachometer 13 having a rotor 14 as well as the stator 11. The mounting of the tachometer 13 is in connection with the frame 12 which might be an end bell or end bracket of a larger motor or generator, for example, with which this tachometer 13 is used. Only a portion of this frame 12 is shown in FIG. 4 and it has bearings only one 17 of which is shown journalling a large shaft 18 on this motor or generator. A grease chamber 19 is provided in the frame 12 adjacent the bearing 17 and close to the exposed end 20 of the large shaft 18.

The end bell or frame 12 is machined with several concentric surfaces of revolution providing the cylindrical surface 21 mounting the bearing 17, a planar outer surface 22 and a rabbeted external shoulder 23. Since these surfaces may all be machined on the same machine and in the same setup it is relatively easy to maintain the concentricity of the rabbeted shoulder 23 with the cylindrical surface 21 within 0.001 inch or even much closer tolerances in ten thousandths of an inch.

The shaft 18 will have a machined cylindrical surface 25 to closely receive the bearing 17 and uring this same machining operation a concentric aperture 26 may be drilled and reamed in the exposed end 20 of this shaft. Accordingly the aperture will be concentric with the cylindrical surface 25 within very close limits. A stub shaft 28 may be secured in the aperture 26 by any suitable means such as a shrink fit to again maintain this stub shaft concentric with the axis 29 of the shaft 18. The tachometer rotor 14 may be secured on the stub shaft 28 by any suitable means such as by an adhesive or by a force fit and again this will maintain the concentricity of the stub shaft 28 with the rotor 14 within the limits of the accuracy of the punching dies punching the laminations of the rotor 14. Generally such rotors are machined on the outer surface while being chucked on the stub shaft 28 and this will maintain this outer surface 30 of the rotor 14 closely concentric with the axis 29.

Figure 1:
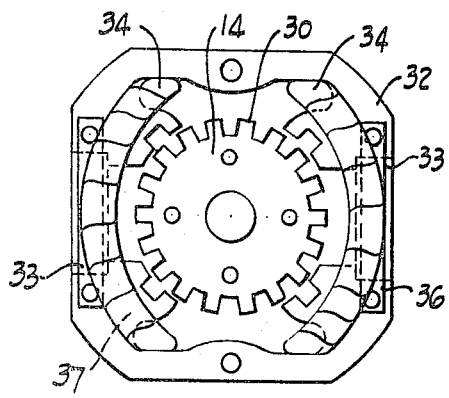
FIG. 1 is a front view of the tachometer rotor and stator before encapsulation.
Figure 2:
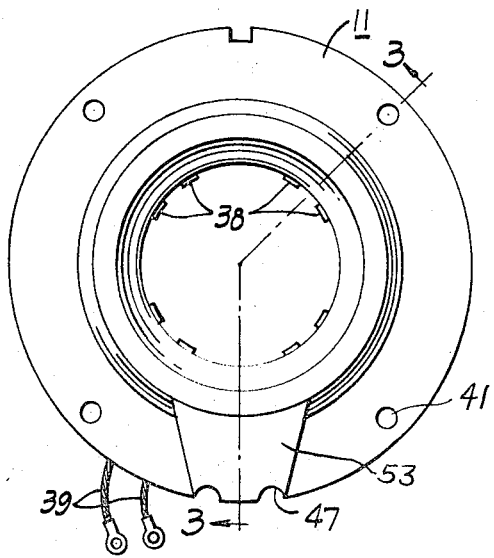
FIG. 2 is a rear view of the stator after encapsulation.

The stator 11 is composed generally of three different elements; namely, a laminated stator core 32, permanent magnets 33, and winding means 34. FIG. 1 shows this stator 11 encapsulation in a hardened plastic 35 and shows the rotor 14 in place to show the relationship of the rotor and stator. The stator core 32 in this preferred embodiment is made up from two separate groups of stator lamination punchings held together by straps 36. These straps also hold the permanent magnets 33 in place between the two groups of stator laminations. The winding means 34 are in two separate coils each surrounding two of the four poles 37. The complete stator includes the hardened plastic 35 as shown in FIG. 2 which hardened plastic completely encapsulates and waterproofs the winding means 34 and also completely encapsulates and waterproofs the magnets 33. This hardened plastic also generally encases the laminated stator core 32 except that the pole tips 38 of the poles 37 may be exposed in the air gap for cooperation with the external salient teeth of the rotor 14. This hardened plastic may be of any suitable type of a resinoid such as a thermosetting resin or epoxy resin which will set to a hard state to encase and physically support and protect the components of the stator. Flexible leads 39 extend out through the hardened plastic for external connection to the winding means 34. Apertures 41, in this case four in number, extend through the hardened plastic 35 parallel to and equi-distant from the axis 29 so that fastening means or bolts 42 may be received in tapped apertures 43 in the frame 12 for securing the stator 11 to this frame.

A simple cover such as a sheet metal cover 45 encloses the entire tachometer 13 and held in place by a single screw 46 into a slot in the plastic 35. Grooves 47 are provided in the plastic to receive the leads 39 and a lead outlet connector 48 is provided on the periphery of the cover 45 and held in place by a screw 49 into a tapped insert 50 in the plastic 35. A grease shield 52 fits in a shoulder on the plastic 35 to keep any excess grease from the interior of the tachometer 13. Also the plastic 35 is formed with a grease relief slot 53 at the bottom so that if excess grease pressure should occur in the grease chamber 19, it will be directed downwardly through the slot 53 and not into the tachometer 13. The hardened plastic 35 is preferably molded around the components of the stator 11 and is provided with a molded cylindrical internal rabbeted shoulder 55. Also an inner planar face 56 is provided on the plastic 35 to mate with the planar face 22. The rabbeted shoulder 23 may be considered a first locator surface means on the frame 12. The rabbeted shoulder 55 on the plastic may be considered a second locator surface means which is co-operable with the annular cylindrical shoulder 23 to maintain the stator core 32 concentric with the rotor 14 within close limits. The rabbeted shoulders 23 and 55 are at least parts of the first and second locator surface means which are parts of surfaces of revolution having substantially the same axis 29. Also in this preferred embodiment these surfaces of revolution are cylindrical. When the complete stator 11 is molded, the cooperating mold sections will quite readily establish the concentricity of the stator core 32 and the internal rabbeted shoulder 55. The mold sections would be machined to have surfaces of revolution about an axis so that this concentricity will be readily established. Accordingly when the bolts 42 secure the stator 11 to the frame 12 these bolts engage only the hardened plastic 35 rather than bearing against any part of the stator core 32. Accordingly the hardened plastic 35 performs the three functions of encapsulating and waterproofing the stator and primarily the winding means 34, the rabbet fit of shoulders 23 and 55 establishes the concentricity of the rotor and stator, and the physical mounting or fastening of the entire tachometer by means of the bolts 42.

This mounting of the tachometer 13 therefore eliminates many problems of establishing concentricity of a dynamoelectric machine relative to the axis of a frame 12. It permits the tachometer 13 to be quickly and accurately mounted and located without the need for any dials, gauges or shims, and permits ready replacement in the field with another of the same type without the need to again gauge and shim the new tachometer to establish this concentricity, and without the need to again drill and ream holes for dowel pins. This greatly decreases the total cost of the tachometer as mounted on the machine with which it is to be used and achieves superior performance by establishing the high degree of concentricity. The frame 12 is described as being a part of a large machine with which the tachometer 13 is used and alternatively this frame 12 may be a shaft and bearing assembly in order to convert the entire tachometer 13 to a free-standing or independent mounting tachometer.

Although this invention has been described in its preferred form with a certain degree of particularly, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A mounting for a stator of a dynamoelectric machine for use with a frame and a rotatable shaft,
    said mounting comprising, in combination,
        first locator surface means on said frame,
        a rotor connected for rotation with the shaft,
        a stator core cooperating with said rotor,
        wind means on said stator core,
        permanent magnets incorporated in said stator core
        an insulator encasing said stator winding means and permanent magnets and having second locator surface means cooperable with said first locator means to substantially co-axially dispose said stator core relative to said rotor,
        and fastening means securing said stator core to the frame.

2. A mounting as set forth in claim 1, wherein said rotor is laminated, and said stator core is laminated.

3. A mounting as set forth in claim 1, wherein said stator core has an annular generally cylindrical air gap surface receiving said rotor,
and said insulator leaving said air gap surface exposed.

References Cited

UNITED STATES PATENTS

| | | | |
|---|---|---|---|
| 2,517,233 | 8/1950 | Peters. | |
| 2,566,618 | 9/1951 | Lindsey | 310—66 X |
| 2,889,475 | 6/1959 | Emerson | 310—171 |
| 3,256,829 | 6/1966 | Schneider | 310—43 |
| 3,261,997 | 7/1966 | Seyfried | 310—90 |

FOREIGN PATENTS

| | | |
|---|---|---|
| 966,156 | 8/1964 | Great Britain. |
| 1,049,666 | 12/1953 | France. |

MILTON O. HIRSHFIELD, Primary Examiner

R. SKUDY, Assistant Examiner

U.S. Cl. X.R.

310—85, 181